(12) United States Patent
Williams

(10) Patent No.: US 7,373,430 B2
(45) Date of Patent: May 13, 2008

(54) CLUSTER ACCELERATOR NETWORK INTERFACE WITH FILTER

(75) Inventor: Michael G. Williams, Newbury Park, CA (US)

(73) Assignee: Nokia Corporation, Espoo (FI)

( * ) Notice: Subject to any disclaimer, the term of this patent is extended or adjusted under 35 U.S.C. 154(b) by 907 days.

(21) Appl. No.: 10/746,315

(22) Filed: Dec. 24, 2003

(65) Prior Publication Data

US 2005/0188114 A1 Aug. 25, 2005

(51) Int. Cl.
*G06F 13/00* (2006.01)
(52) U.S. Cl. .................... 709/250; 709/224; 709/238
(58) Field of Classification Search ........... 709/230, 709/238, 245, 249, 250
See application file for complete search history.

(56) References Cited

U.S. PATENT DOCUMENTS

| 6,006,259 | A | 12/1999 | Adelman et al. |
| 6,341,130 | B1 * | 1/2002 | Lakshman et al. .......... 370/389 |
| 6,798,743 | B1 * | 9/2004 | Ma et al. .................... 370/235 |
| 6,925,052 | B1 * | 8/2005 | Reynolds et al. ........... 370/217 |
| 6,990,095 | B2 * | 1/2006 | Wu et al. .................... 370/367 |
| 2003/0128987 | A1 * | 7/2003 | Mayer ......................... 398/98 |

* cited by examiner

*Primary Examiner*—Viet D. Vu
(74) *Attorney, Agent, or Firm*—Morgan & Finnegan, L.L.P.

(57) ABSTRACT

An apparatus for improving communication between network devices in a cluster. is provided. A filter is used to pre-process packets to determine if they need to be further processed by the processor of the network device. If true, the packets are presented on a bus either in real time or buffered and presented at time intervals. A synch component is used to pre-process packets to determine if they are associated with synchronization information, management information, filter configuration information.

24 Claims, 10 Drawing Sheets

CLUSTER ACCELERATOR NETWORK INTERFACE WITH FILTER

FIELD OF THE INVENTION

The invention is related to networks. In particular the invention is related to a method and apparatus for improving communication over a network cluster.

BACKGROUND OF THE INVENTION

Network devices can be grouped in a variety of ways. One such grouping is a cluster where each network device can be employed to provide fail-over support for one another. For example, if one of the network devices in the cluster became unavailable, another network device in the cluster would continue to process the load that the unavailable network device had been handling. Additionally, a load can be balanced across several network devices in a cluster. Different portions of the load can be balanced across multiple network devices in the cluster based on one or more factors.

BRIEF DESCRIPTION OF THE DRAWINGS

Non-limiting and non-exhaustive embodiments of the present invention are described with reference to the following drawings, in which.

DETAILED DESCRIPTION

Figure 1:
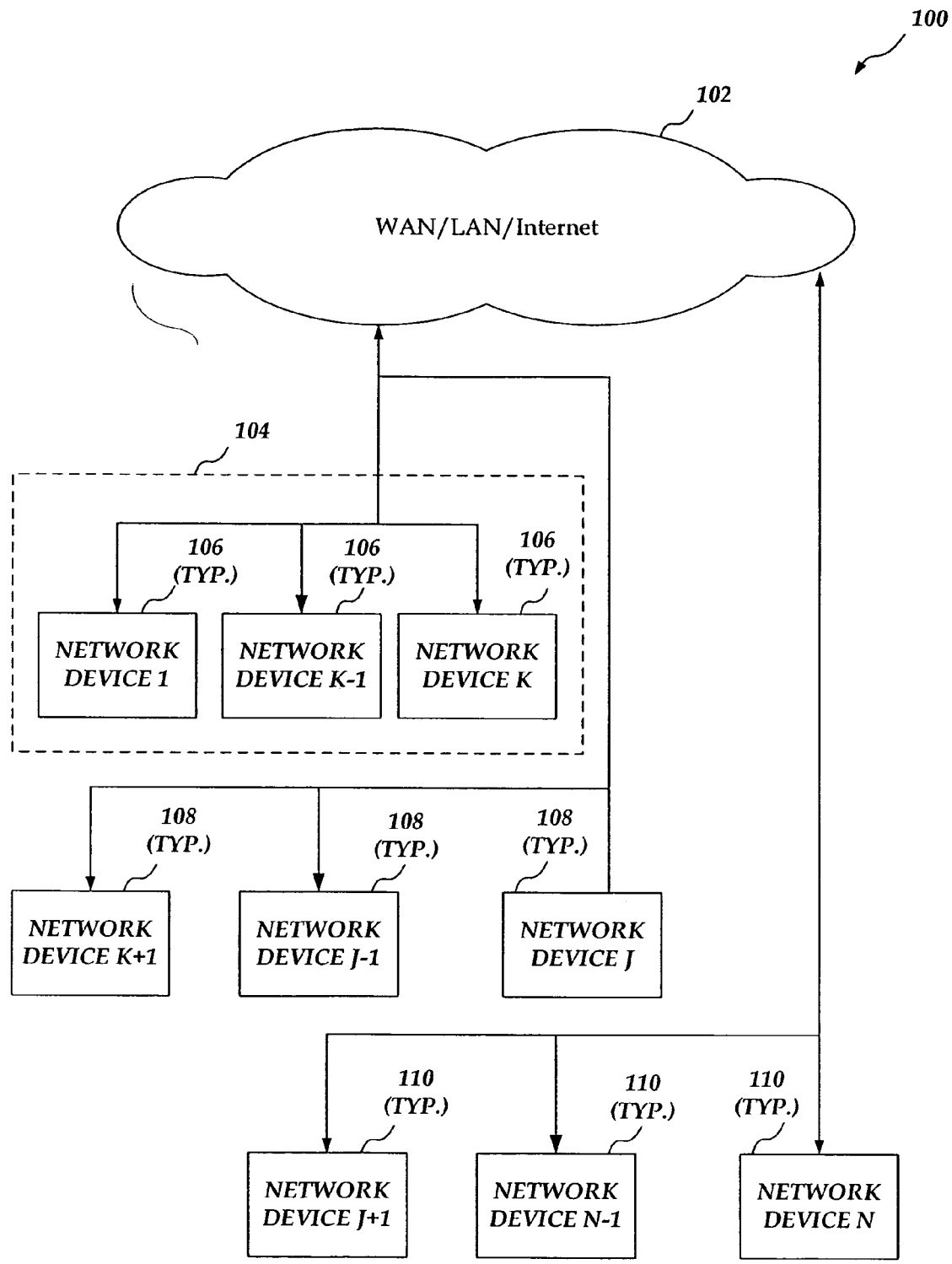
FIG. 1 illustrates a block diagram of a network devices on a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to an apparatus for improving communication over a network between and through network devices in a cluster. Each network device in the cluster that includes a filter component can pre-process each received packet to determine if a received packet should be presented on the I/O bus of the respective network device for further processing. A received packet that is not associated with at least one network device in the cluster would not be provided on their I/O buses for further processing. Since the resources of each network device are conserved by processing primarily those packets associated with the network device, overall communication between the network devices in the cluster can be accelerated.

In one embodiment, the operation of the filter component is encoded in firmware for faster processing of received packets, e.g., Programmable Logic Arrays (PALs), Programmable Read Only Memory (PROM), and Application Specific Integrated Circuits (ASIC), field-programmable gate array (FPGA), and the like. In another embodiment, at least a portion of the actions of the filter component are performed by software. In some embodiments, the filter component pre-processes packets that are received by a network interface, Network Interface Card (NIC), and the like. In other embodiments, the packets are both pre-processed and received by the filter component. In still other embodiments, the filter component operates with a network processor for receiving and pre-processing the packets. In still another embodiment, a synch component of the invention can be employed to pre-process management and data synchronization packets that are unicast or multicast to members in the cluster.

FIG. 1 illustrates a block diagram of an overview of a system 100 which includes a network (WAN/LAN/Internet) 102 that enables communication with resources and network devices arranged in differing configurations. Cluster 104 includes a plurality of network devices 106 (1–K) that are in communication with each other over a local area network. Other network devices 108 (K+1 through J) are in communication with each other except that they are not arranged in a cluster. Also, cluster 104 (network devices 106) and other network devices 108 are coupled to WAN/LAN/Internet 102 by another network device, such as a router, bridge, switch, firewall, and the like. Additionally, network devices 110 (J+1 through K) are separately coupled to WAN/LAN/Internet 102 through other network devices, such as discussed above.

Other network devices and resources (not shown) can be coupled to WAN/LAN/Internet 104 for communication with any of network devices 106, 108 and 110. Also, network devices 106, 108 and 110 are further configured to transmit, receive, and process packets. Communication between network devices 106 in cluster 104 are typically unicast (sent directly to one member) or multicast (sent to all members of the cluster).

WAN/LAN/Internet 102 and the LANs within and outside cluster 104 are configured to employ any form of computer readable media including, but not limited to, wired LAN and wireless LAN for communicating information from one electronic network device to another. WAN/LAN/Internet 102 can include several different types of networks, e.g., the Internet, local area networks (LANs), wide area networks (WANs), direct connections, such as through a universal serial bus (USB) port, other forms of computer-readable media, and any combination thereof. Also, on an interconnected set of LANs, including those based on differing architectures and protocols, a router typically acts as a link between LANs, enabling messages to be sent from one to another.

Also, communication links within LANs may include twisted wire pair or coaxial cable or wireless LAN, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, WAN/LAN/Internet 102 can include any communication method by which information may travel to network cluster 104.

Figure 2:
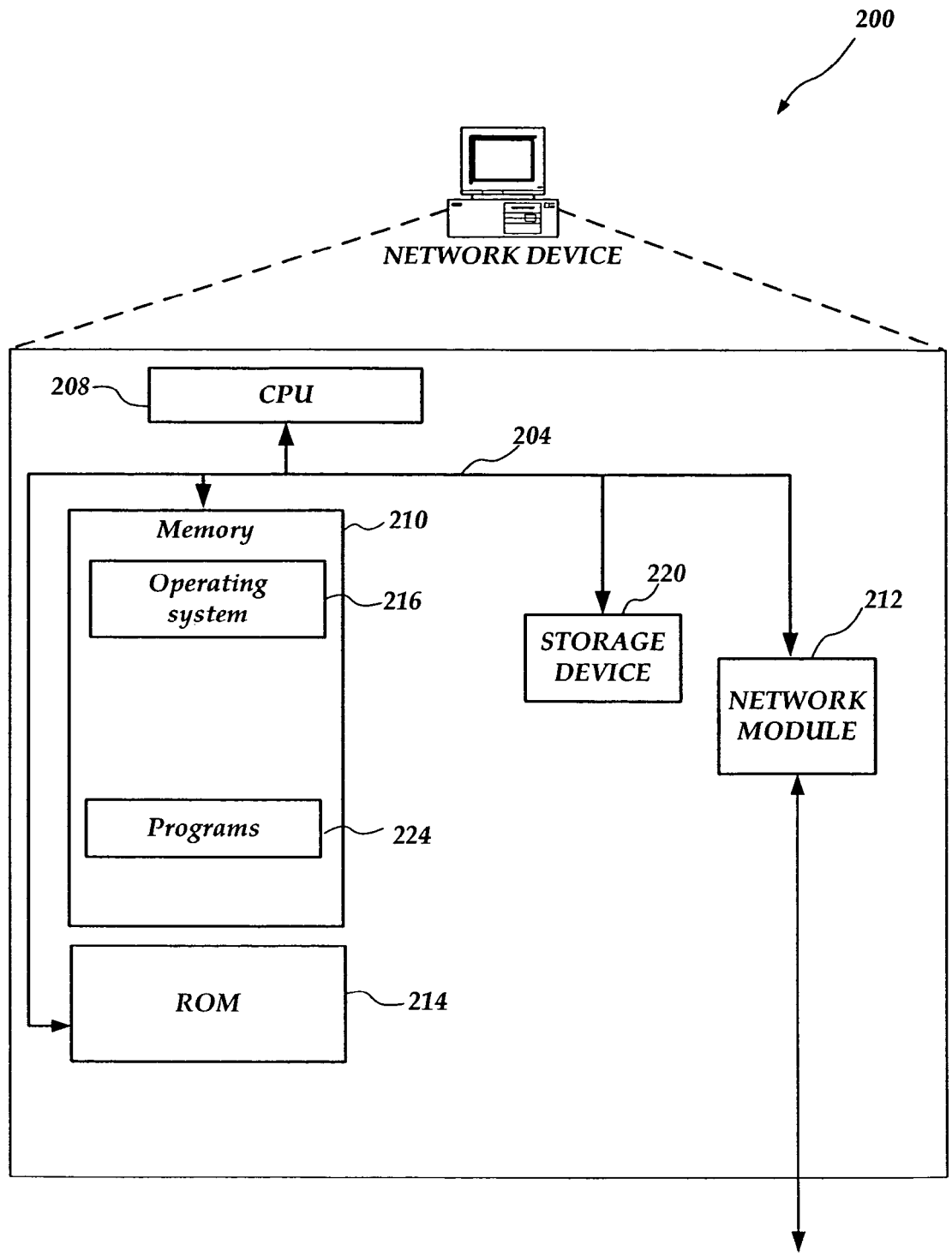
FIG. 2 shows a block diagram of an exemplary network device.

FIG. 2 illustrates a block diagram of an exemplary network device 200. Network device 200 may include more or fewer components than those shown. In FIG. 2, network device 200 includes central processing unit (CPU) 208, mass memory, network module 212, and storage device 220, which are coupled to each other via bus 204. Network device 200 may contain one or more CPUs, with one of the CPU(s) operating as the main CPU. Network module 212 includes circuitry for connecting to a network, and may be used with various communication protocols such as the TCP/IP, UDP/IP, and the like. Network module 212 includes and interfaces with circuitry and components for transmitting messages and data over a communications medium.

The mass memory generally includes random access memory (RAM) 210 and read-only memory ("ROM") 214. RAM 210 stores operating system 216 for controlling the operation of network device 200 and other programs 224 and data for enabling the operation of network device 200.

Storage media may include volatile and nonvolatile, removable and non-removable media implemented in any method or technology for storage of information, such as computer readable instructions, data structures, program modules or other data. Examples of computer storage media include RAM 210, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Although not shown, network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to a blade server. Network device 200 can also be implemented as a combination of blades and additional components in a chassis.

Additionally, network device 200 may be configured to operate as one or more servers, routers, bridges, switches, firewalls, server array controllers, load balancer, and the like.

Figure 3:
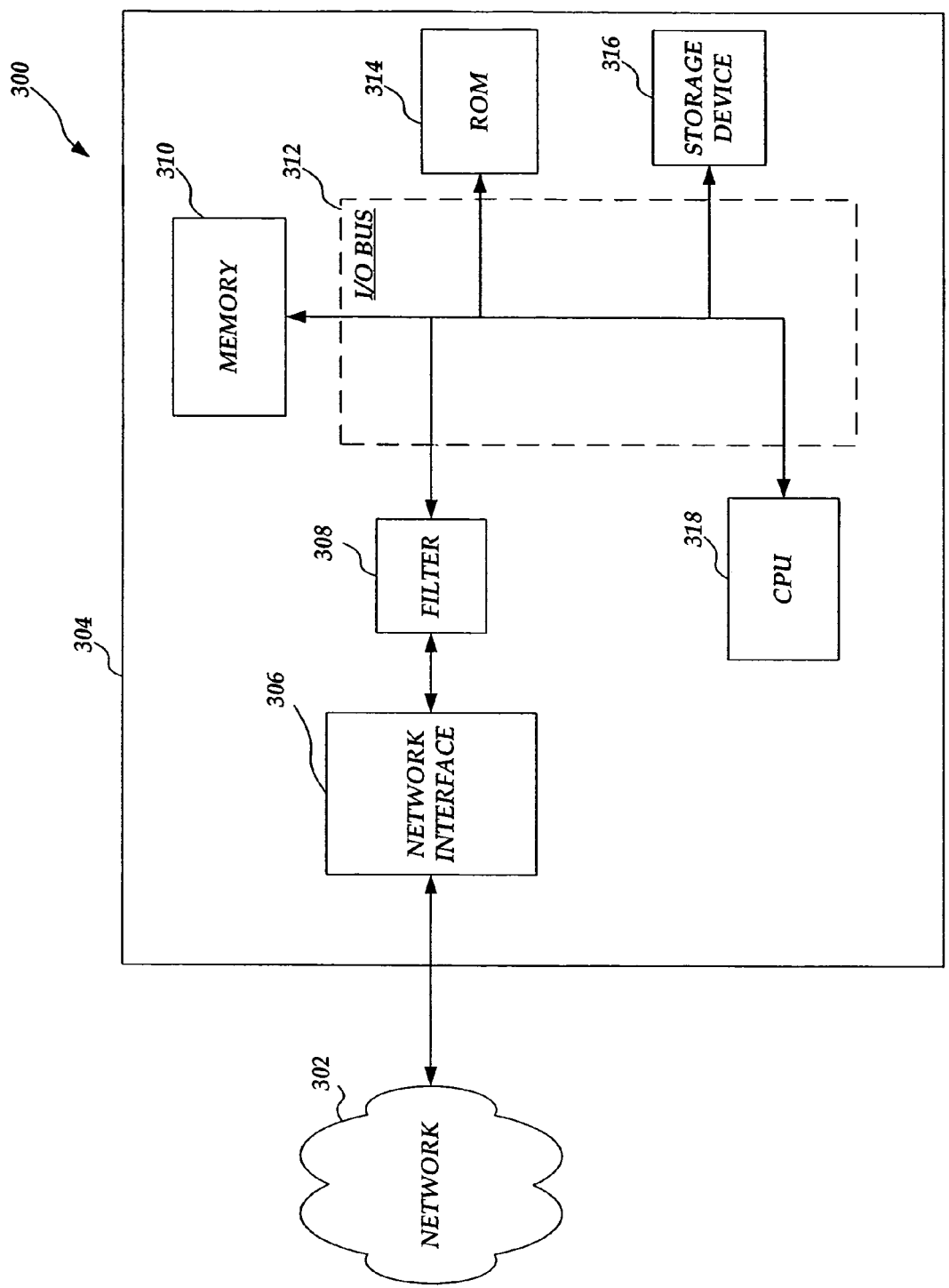
FIG. 3 illustrates a block diagram of one embodiment of an exemplary cluster network interface apparatus.

FIG. 3 illustrates a block diagram of an overview of system 300 where network device 304 is coupled to network 302. Network 302 can include a LAN, WAN, Internet, and the like, for enabling communication with other network devices and resources that are logically disposed inside or outside of a cluster. Also, network device 304 is configurable as a member of a cluster in a manner substantially similar to cluster 104, as shown in FIG. 1. Network device 304 includes network interface 306, filter component 308, I/O bus 312, memory 310, ROM 314, storage device 316, and CPU 318. Also, in other embodiments, network device 304 may include more or less components than those shown.

Network interface 306 is configured to receive and transmit packets over network 302. Filter component 308 is arranged to pre-process the received packet to determine if should be presented on I/O bus 312 for further processing by CPU 318. Also, if filter component 308 determines that the received packet should not receive further processing, the received packet is ignored and no further actions are taken. In one embodiment, filter component 308 is configured to buffer received packets over a period of time that are determined to merit further processing. At periodic intervals, the buffered packets are presented on I/O bus 312 for processing by CPU 318.

Figure 4:
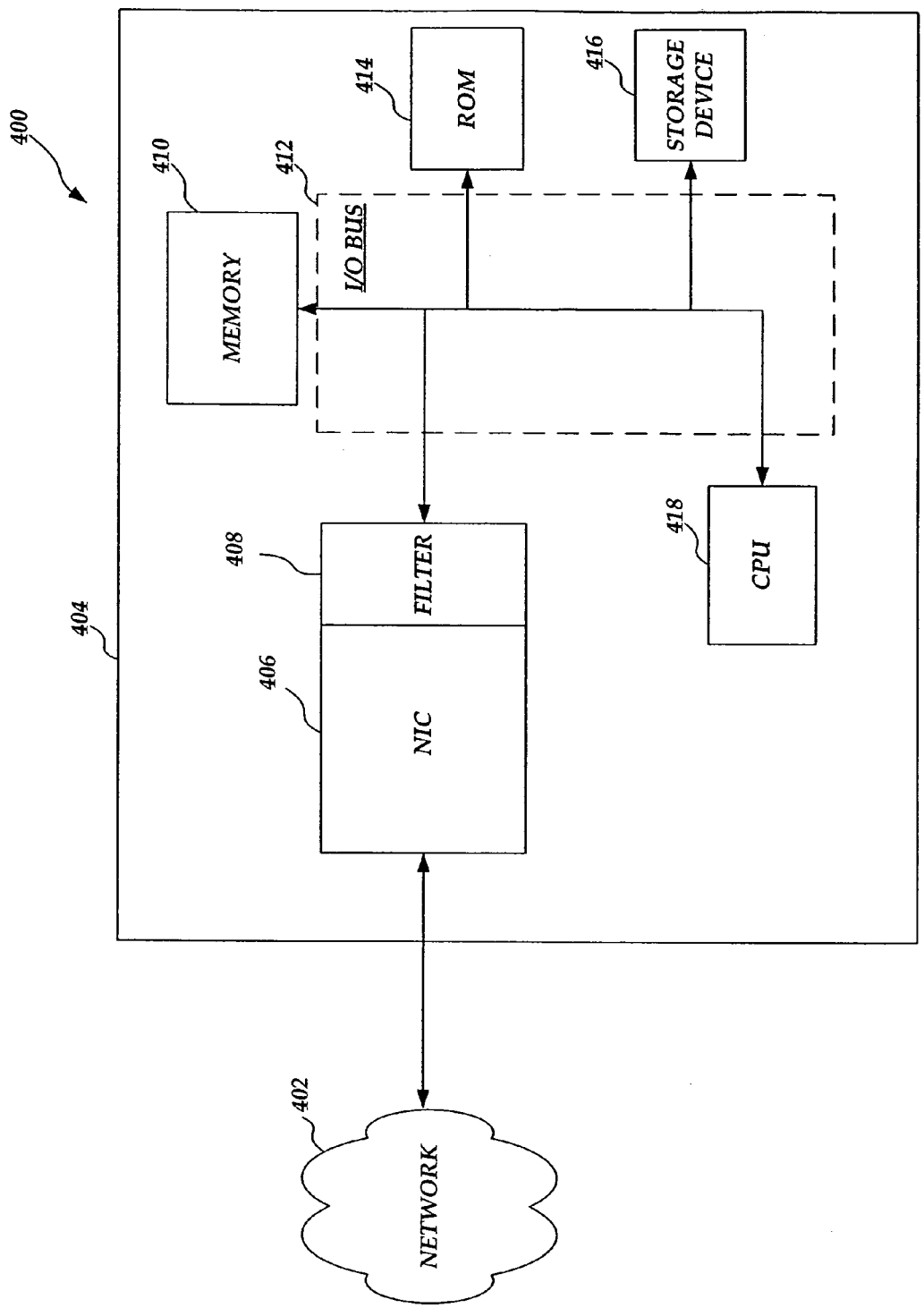
FIG. 4 shows a block diagram of another embodiment of an exemplary cluster network interface apparatus.

FIG. 4 illustrates a block diagram of an overview of system 400 where network device 404 is coupled to network 402. Network device 404 includes I/O bus 412, memory 410, ROM 414, storage device 416, and CPU 418, which are arranged to operate in substantially the same manner as similar components discussed above for FIG. 3.

Additionally, network device 404 includes network interface card (NIC) 406 which is at least physically integrated with filter component 408 on the same card. NIC 406 receives packets communicated on the network and passes the packets to filter component 408 for pre-processing. Filter component 408 pre-processes a received packet in substantially the same manner as discussed above for filter component 308 to determine if the received packet should be presented on I/O bus 412 for further processing by CPU 418. Also, in one embodiment, filter component 408 is configured to buffer received packets over a period of time that are determined to merit further processing. At periodic intervals, the buffered packets are presented on I/O bus 412 for processing by CPU 418.

Figure 5:
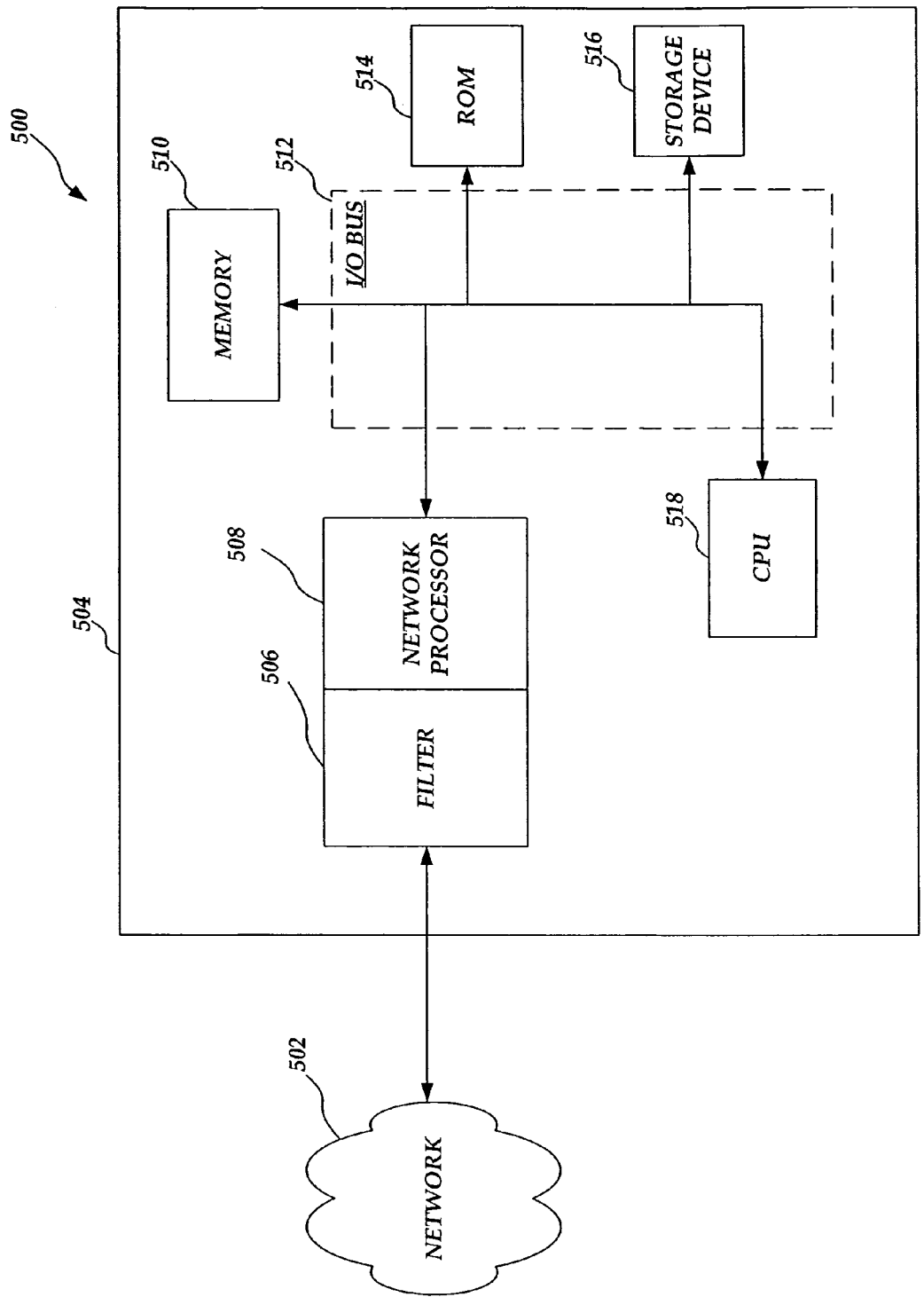
FIG. 5 illustrates a block diagram of yet another embodiment of an exemplary cluster network interface apparatus.

FIG. 5 illustrates a block diagram of an overview of system 500 where network device 504 is coupled to network 502. Network device 504 includes I/O bus 512, memory 510, ROM 514, storage device 516, and CPU 518, which are arranged to operate in substantially the same manner as similar components discussed above.

Additionally, network device 504 includes network processor 508 which is at least physically integrated with filter component 506 on the same card. Filter component 506 receives packets communicated on the network and preprocesses them in substantially the same manner as the filter components discussed above to determine if the received packets should be presented on I/O bus 512 for further processing by CPU 518. Network processor 508 is configured to enable buffering of received packets that merit further processing and the presentation of these packets at periodic intervals on I/O bus 512. Network processor 508 is further configured to process communication over network 502 with other network devices.

Figure 6:
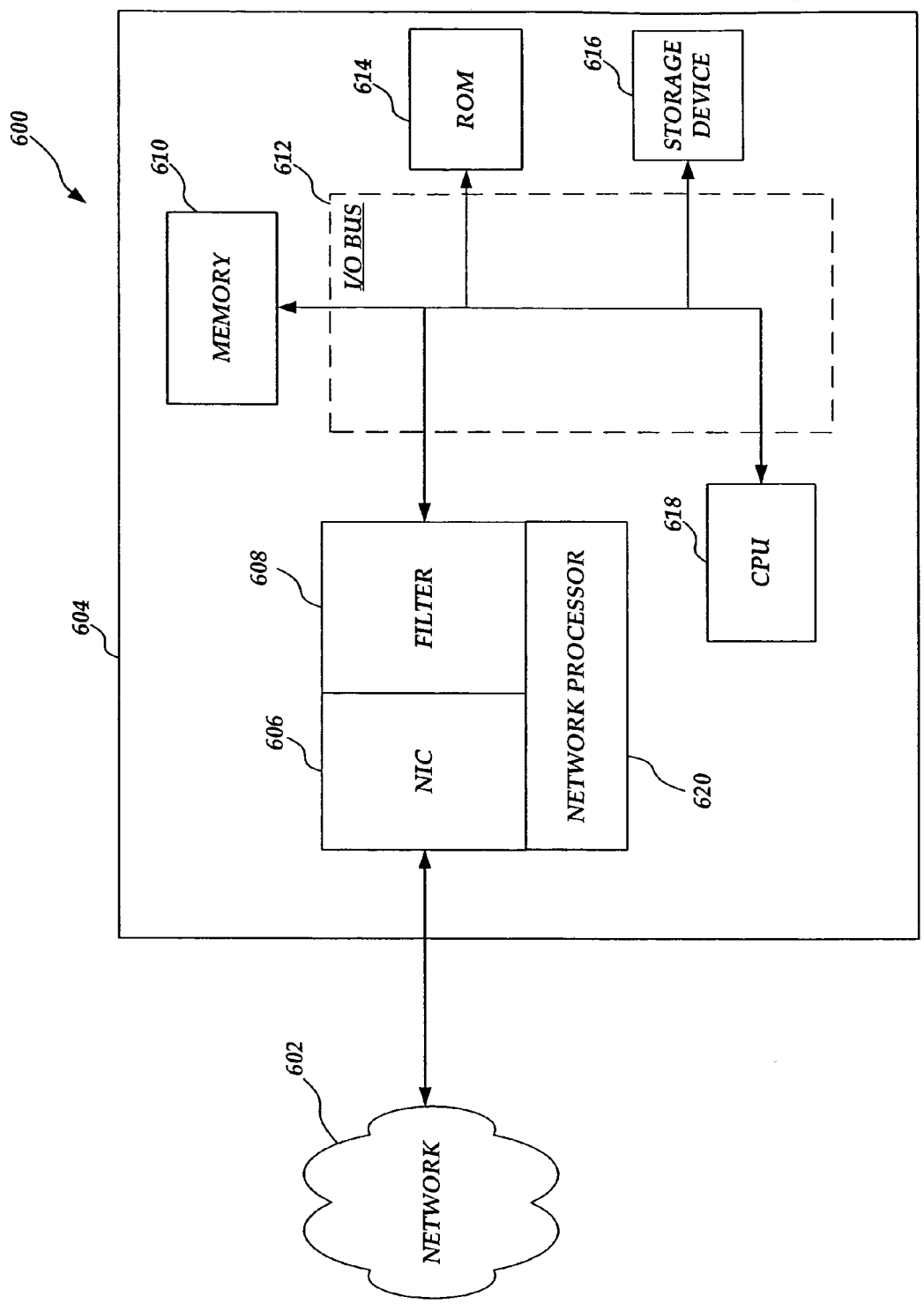
FIG. 6 shows a block diagram of still another embodiment of an exemplary cluster network interface apparatus.

FIG. 6 illustrates a block diagram of an overview of system 600 where network device 604 is coupled to network 602. Network device 604 includes I/O bus 612, memory 610, ROM 614, storage device 616, and CPU 618, which are arranged to operate in substantially the same manner as similar components discussed above.

Additionally, network device 604 includes network processor 620 and NIC 606 which are at least physically integrated with filter component 608 on the same card. NIC 606 receives packets from network 602 and provides them to filter component 608 for preprocessing in substantially the same manner as the filter components discussed above to determine if the received packets should be presented on I/O bus 612 for further processing by CPU 618. Also, network processor 620 is configured to enable the buffering of received packets that merit further processing and the eventual presentation of these packets at periodic intervals on I/O bus 612. Network processor 620 is further configured to process communication over network 602 with other network devices.

Figure 7A:
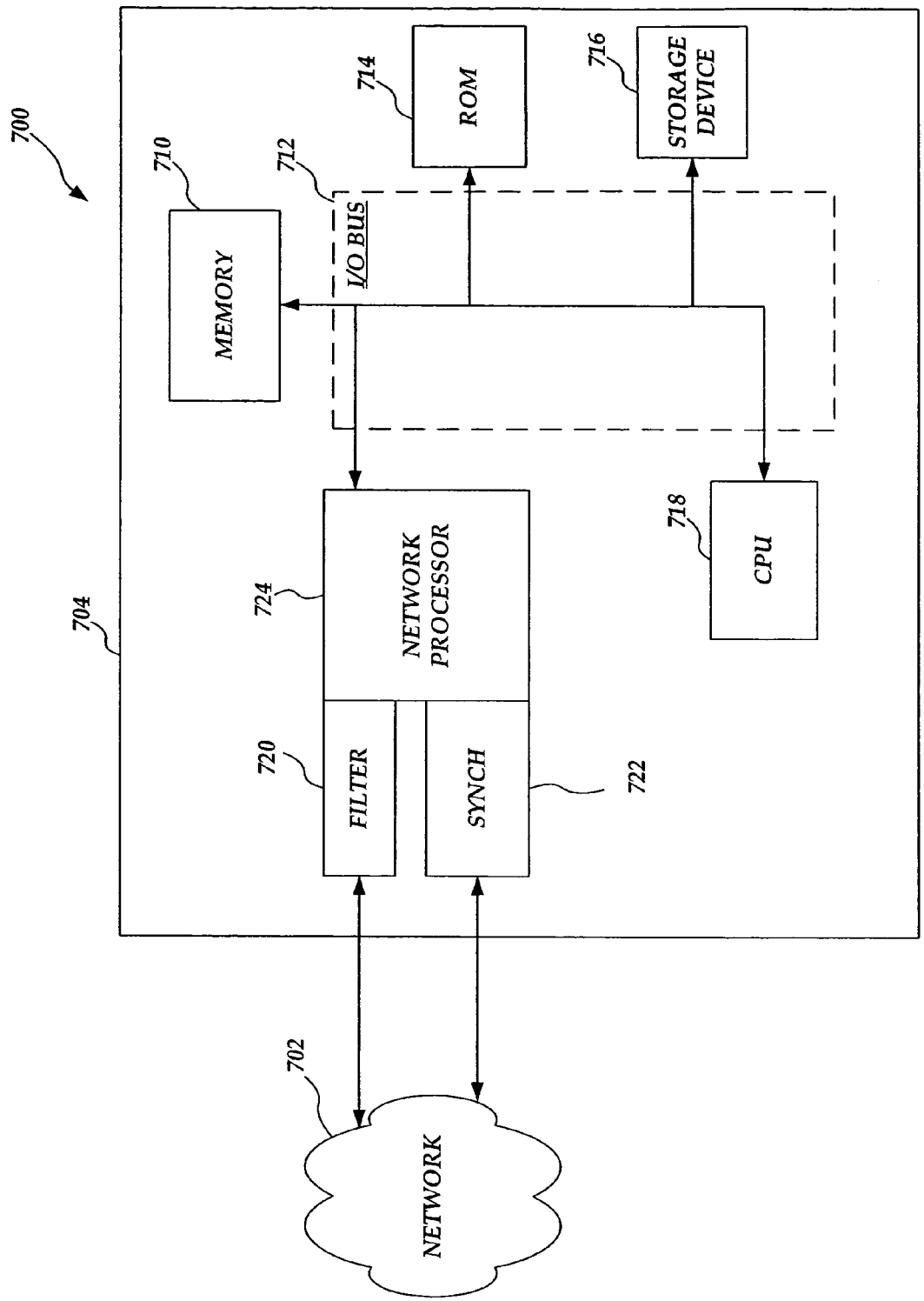
FIG. 7A illustrates a block diagram of yet still another embodiment of an exemplary cluster network interface apparatus.

FIG. 7A illustrates a block diagram of an overview of system 700 where network device 704 is coupled to network 702. Network device 704 includes I/O bus 712, memory 710, ROM 714, storage device 716, and CPU 718, which are arranged to operate in substantially the same manner as similar components discussed above.

Additionally, network device 704 includes synch component 722 and network processor 724 which are at least physically integrated with filter component 720 on the same card. Both filter component 720 and synch component 722 are configured as separate ports or taps for transmitting and receiving packets over network 702. The filter component 720 preprocesses the received packets in substantially the same manner as the filter components discussed above to determine if the received packets are addressed to network device 704 and should be presented on I/O bus 712 for further processing by CPU 718. Also, synch component 722 is configured to receive packets and determine if they contain synchronization and/or control data that should be presented on I/O bus 712 for further processing by CPU 718. Synchronization information can be employed to determine the load on a network device in a cluster or if a network device in the cluster is unavailable. The synch component may dynamically configure the filter component based on changes in cluster membership or load.

Also, network processor 724 is configured to enable the buffering of received packets that merit further processing and the eventual presentation of these packets at periodic intervals on I/O bus 712. Network processor 724 is further configured to process communication over network 702 with other network devices.

Figure 7B:
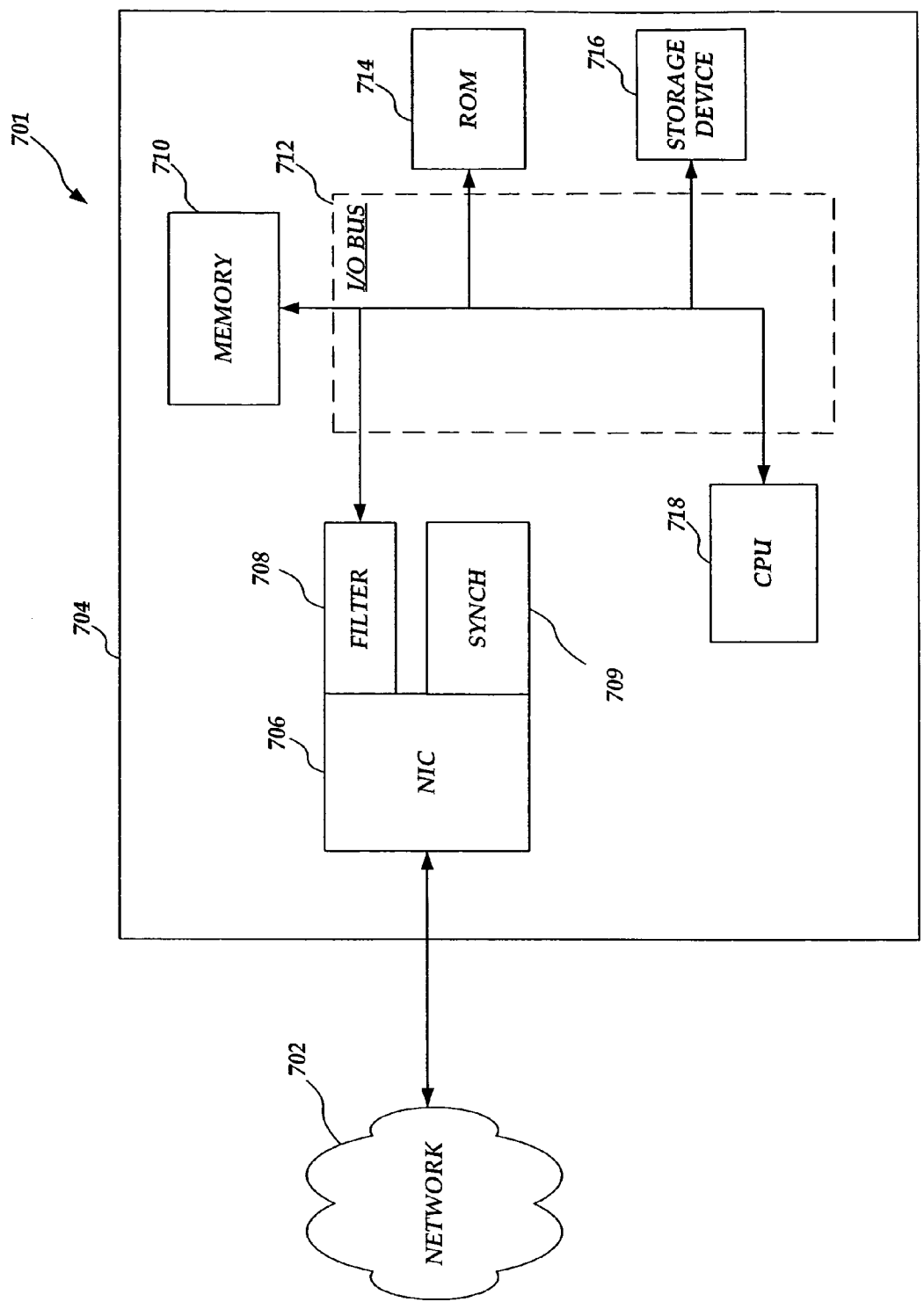
FIG. 7B shows a block diagram of another embodiment of an exemplary cluster network interface.

FIG. 7B illustrates a block diagram of an overview of system 701 where another embodiment of network device 704 is shown coupled to network 702. Network device 704 includes I/O bus 712, memory 710, ROM 714, storage device 716, and CPU 718, which are arranged to operate in substantially the same manner as similar components discussed above.

Additionally, network device 704 includes synch component 709 and network NIC 706 which are at least physically integrated with filter component 708 on the same card. NIC 706 receives packets from network 702. The filter component 720 preprocesses the received packets in substantially the same manner as the filter components discussed above to determine if the received packets are addressed to network device 704 and should be presented on I/O bus 712 for further processing by CPU 718. Also, synch component 722 is configured to determine if the received packets contain synchronization and/or control data that should be presented on I/O bus 712 for further processing by CPU 718. Synchronization information can be employed to determine the load on a network device in a cluster or if a network device in the cluster is unavailable.

Additionally, filter component 708 can be configured to enable the buffering of received packets that merit further processing and the eventual presentation of these packets at periodic intervals on I/O bus 712. NIC 706 is further configured to process communication over network 702 with other network devices.

Figure 7C:
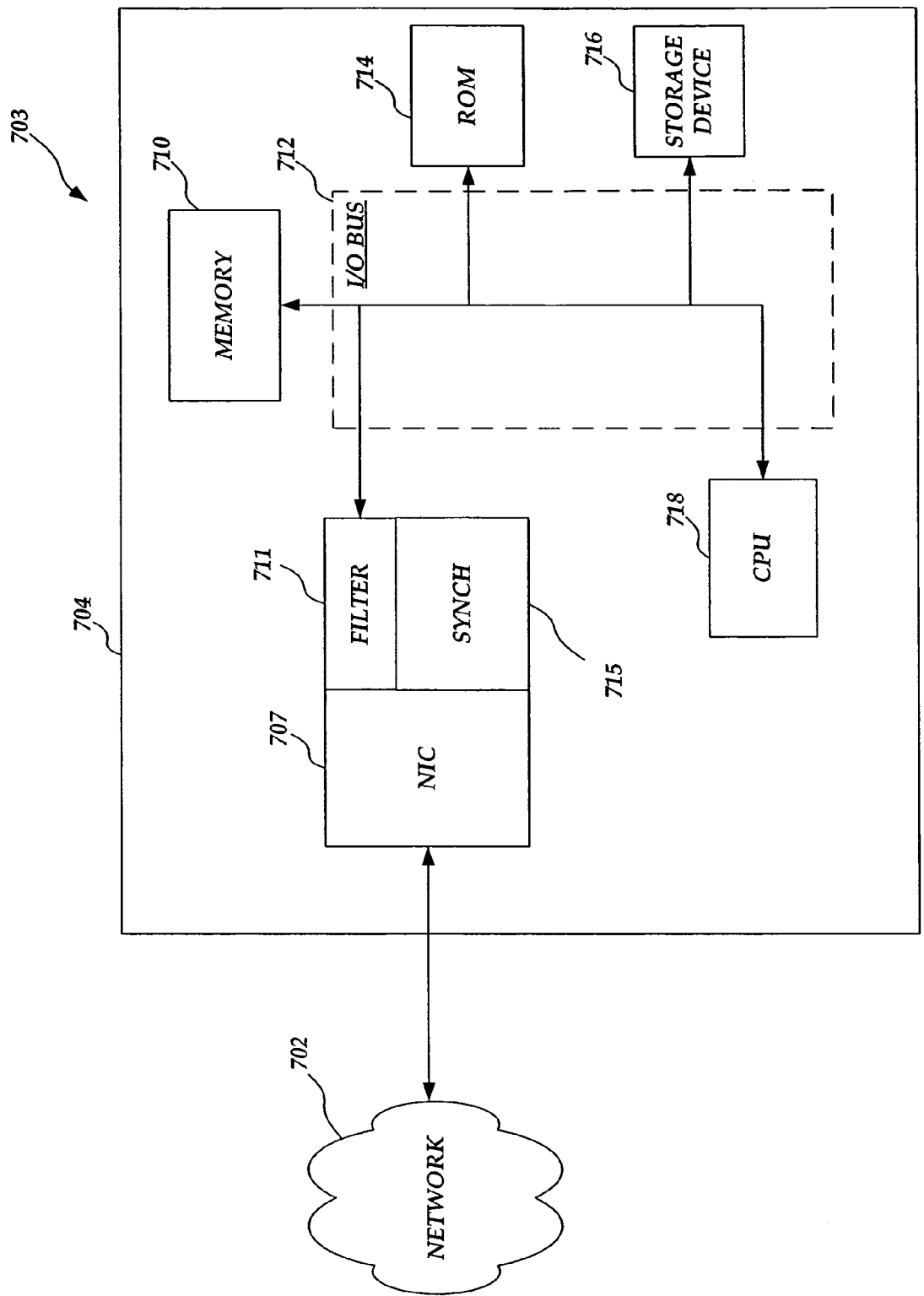
FIG. 7C illustrates a block diagram of another embodiment of an exemplary network interface.

FIG. 7C illustrates a block diagram of an overview of system 701 where another embodiment of network device 704 is shown coupled to network 702. Network device 704 includes I/O bus 712, memory 710, ROM 714, storage device 716, and CPU 718, which are arranged to operate in substantially the same manner as similar components discussed above.

Additionally, network device 704 includes NIC 707 and synch component 715 and filter component 711 which are integrated together on the same card. NIC 707 receives packets from network 702. The filter component 711 preprocesses the received packets in substantially the same manner as the filter components discussed above to determine if the received packets are addressed to network device 704 and should be presented on I/O bus 712 for further processing by CPU 718. Also, synch component 715 is configured to determine if the received packets contain synchronization and/or control data that should be presented on I/O bus 712 for further processing by CPU 718. Synchronization information can be employed to determine the load on a network device in a cluster or if a network device in the cluster is unavailable. The synch component may communicate directly to the filter component and dynamically configure the filter component based on changes in cluster membership or load.

Figure 8:
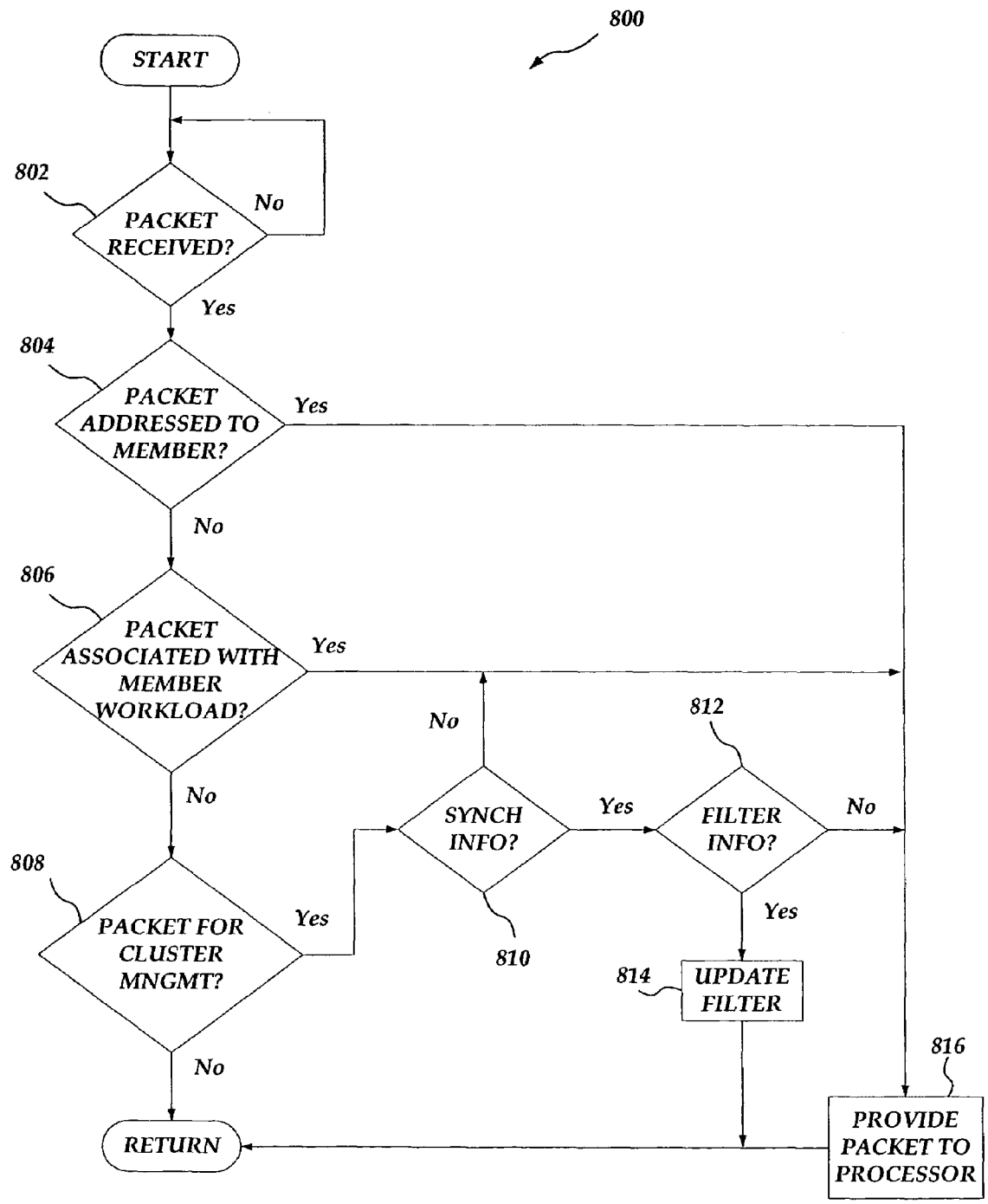
FIG. 8 illustrates a flow chart of an exemplary process for handling packets intended for processing by one of the network devices included in a cluster, in accordance with the invention.

FIG. 8 illustrates a flow chart of an overview 800 of a process for pre-processing packets at a network device in a cluster to determine whether to ignore a packet or present it for further processing by the network device.

After a start block, the process proceeds to decision block 802 where the process loops until it is determined that a packet has been received. The received packet may have been unicast to this particular network device, or multi-cast to each network device in the cluster. Next, the process advances to decision block 804 where the process determines if the packet was addressed to that particular member of the cluster. At decision block 804, it is determined if the packet was unicast or multicast to this cluster member. If true, the process advances to block 816 where the received packet is provided to a processor of the network device for further processing. Next, the process returns to processing other actions.

Alternatively, if the determination at block 804 was negative, the process would step to decision block 806 where it would be determined if the packet was associated with the workload of a member of the cluster. If true, the process would flow to decision block 816 and perform substantially the same actions discussed above. However, if the determination at decision block 806 was false, the process would move to decision block 808 where another determination would be made whether the received packet was a cluster management packet. A cluster management packet could be multicast to the members of the cluster and could include information related to synchronization, load balancing, and the like. If false, the process would return to performing other actions.

Alternatively, if the determination at decision block 808 was true, the process would advance to decision block 810 where it would be determined if the packet included synchronization information. If the determination at decision block 810 is false, the process moves to block 816 and performs substantially the same actions discussed above. However, if the determination at decision block 810 was found to be true, the process steps to decision block 812 where it would be determined if the packet included information regarding the filter. If true, the process would step to block 814 where the filter information would be decoded and employed to update the filter. Next, the process would return to performing other actions. However, if the determination at decision block 812 was false, the process would step to block 816 and perform substantially the same actions discussed above.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A network device, comprising:
a processor coupled to a bus; and
a network component that is configured to receive and transmit packets over the network, the network component includes
a filter component that pre-processes each received packet to determine if each received packet is associated with the network device,
wherein each received packet that is associated with the network device is provided on the bus for further processing by the processor,
wherein the network device is a member of a cluster of network devices on a network,
wherein the network component includes a synch component for pre-processing received packets to determine if the received packet includes management information associated with the cluster of network devices, wherein each such received packet is provided on the bus for further processing by the processor, and
wherein the network component includes a synch component that enables the updating of a configuration of the filter based on at least one of cluster membership and load.

2. The network device of claim 1, wherein
the network component further includes at least one of a network interface, a Network Interface Card (NIC) and a network processor.

3. The network device of claim 1, wherein
the filter component is further configured to reject each received packet that is unassociated with the network device.

4. The network device of claim 1, wherein
the network component further includes a network processor for processing the communication of each packet for the network device over the network.

5. The network device of claim 4, wherein the configuration of the filter component and the network processor are integrated.

6. The network device of claim 1, wherein
the network component is further configured to:
buffer the received packets that are associated with the network device, and
provide the buffered packets to the bus at intervals of time.

7. The network device of claim 1, wherein
the filter component pre-processes the packet prior to generating an interrupt to indicate that the packet is provided on the bus for processing by the processor.

8. A network device, comprising:
a processor coupled to a bus; and
a network component that is configured to receive and transmit packets over the network, the network component includes
a filter component that pre-processes each received packet to determine if each received packet is associated with the network device,
wherein each received packet that is associated with the network device is provided on the bus for further processing by the processor,
wherein the network device is a member of a cluster of network devices on a network, and
wherein the determination for each packet's association with the network device includes determining at least one of:
if the received packet was broadcast to every network device on the network;
if the received packet was multicast to every network device in the cluster;
if the received packet was unicast to the network device;
if the received packet is part of a load for processing by the network device; and
if the packet is associated with management of the cluster of network devices.

9. The network device of claim 1, wherein the filter comprises at least one of: a field-programmable gate array, an application-specific integrated circuit, a complex programmable logic device, a programmable logic array, and a read-only memory.

10. A network component that is configured to receive and transmit packets for a network device on a network, comprising:
a filter component that pre-processes each received packet to determine if each received packet is associated with the network device,
wherein each received packet that is associated with the network device is provided on a bus for further processing by a processor, and
wherein the network device is a member of a cluster of network devices on the network; and
a synch component for pre-processing packets to determine if the received packet includes configuration information regarding the filter, wherein the synch component enables the configuration information to be employed to update a configuration of the filter.

11. The network device of claim 1, further comprising a synch component that performs actions, including:
if the packet is associated with synchronization information for the cluster of network devices, providing the packet on the bus; and if the packet is associated with filter information, enabling the filter to be configured in accordance with the filter information.

12. The network device of claim 1, wherein
the filter is coupled to a first port in communication with the network, and
the synch component is coupled to a second port in communication with the network.

13. The network component of claim 10, further includes at least one of a network interface, a Network Interface Card (NIC) and a network processor.

14. The network component of claim 10, wherein the filter component is further configured to reject each received packet that is unassociated with the network device.

15. The network component of claim 10 wherein the network component is further configured to:
buffer the received packets that are associated with the network device; and
provide the buffered packets to the bus at intervals of time.

16. The network component of claim 10, wherein
the filter component pre-processes the packet prior to generating an interrupt to indicate that the packet is provided on the bus for processing by the processor.

17. A network component that is configured to receive and transmit packets for a network device on a network, comprising:
a filter component that pre-processes each received packet to determine if each received packet is associated with the network device,
wherein each received packet that is associated with the network device is provided on a bus for further processing by a processor,
wherein the network device is a member of a cluster of network devices on the network, and
wherein the determination for each packet's association with the network device includes determining at least one of:
if the received packet was broadcast to every network device on the network;
if the received packet was multicast to every network device in the cluster;
if the received packet was unicast to the network device;
if the received packet is part of a load for processing by the network device; and
if the packet is associated with management of the cluster of network devices.

18. The network component of claim 10, further includes a synch component for pre-processing received packets to determine if the received packet includes information associated with the management of the cluster of network devices, wherein each received packet that is associated with management information is provided on the bus for further processing by the processor.

19. The network component of claim 10 further comprising a synch component that performs actions, including if the packet is associated with synchronization information for the cluster of network devices, providing the packet on the bus.

20. The network component of claim 10, further comprising:
a first tap in communication with the network, wherein the first tap is coupled to the filter, and
a second tap in communication with the network, wherein the second tap is coupled to a synch component.

21. A method for improving communication over a network, comprising:
employing a filter component to pre-processes each of one or more received packets to determine if each received packet is associated with a network device,
wherein each received packet that is associated with the network device is provided on a bus for further processing by a processor, and
wherein the network device is a member of a cluster of network devices on the network; and
employing a synch component for pre-processing packets to determine if the received packet includes configuration information regarding the filter, wherein the synch component enables the configuration information to be employed to update a configuration of the filter.

22. The method of claim 21, wherein the received packet is pre-processed to determine if an interrupt is to be generated, wherein the interrupt indicates that the received packet is to be further processed by the network device.

23. The method of claim 21, further comprising:
buffering the packet; and
if it is decided that the packet is to be presented on the bus:
providing the packet as part of a group of other packets that are provided for further processing.

24. An apparatus for enabling communication for a network device, comprising:
filter means for pre-processing each of one or more received packets to determine if each received packet is associated with the network device,
wherein each received packet that is associated with the network device is provided on a bus for further processing by a processor, and
wherein the network device is a member of a cluster of network devices on the network; and
synch means for pre-processing packets to determine if the received packet includes configuration information regarding the filter, wherein the synch means enables the configuration information to be employed to update a configuration of the filter.

* * * * *